(12) United States Patent
Yamazaki et al.

(10) Patent No.: US 10,628,896 B2
(45) Date of Patent: Apr. 21, 2020

(54) SYSTEM STABILITY MONITORING DEVICE AND SYSTEM STABILITY MONITORING SYSTEM

(71) Applicant: HITACHI, LTD., Tokyo (JP)

(72) Inventors: Jun Yamazaki, Tokyo (JP); Masahiro Yatsu, Tokyo (JP); Sumito Tobe, Tokyo (JP); Yasuo Sato, Tokyo (JP); Osamu Tomobe, Tokyo (JP); Eisuke Kuroda, Tokyo (JP)

(73) Assignee: HITACHI LTD., Tokyo (JP)

( * ) Notice: Subject to any disclaimer, the term of this patent is extended or adjusted under 35 U.S.C. 154(b) by 491 days.

(21) Appl. No.: 15/507,397

(22) PCT Filed: May 28, 2015

(86) PCT No.: PCT/JP2015/065366
§ 371 (c)(1),
(2) Date: Feb. 28, 2017

(87) PCT Pub. No.: WO2016/035399
PCT Pub. Date: Mar. 10, 2016

(65) Prior Publication Data
US 2017/0278200 A1  Sep. 28, 2017

(30) Foreign Application Priority Data
Sep. 3, 2014  (JP) .................. 2014-178778

(51) Int. Cl.
*H02J 3/24* (2006.01)
*G06Q 50/06* (2012.01)
*H02J 13/00* (2006.01)

(52) U.S. Cl.
CPC ............... *G06Q 50/06* (2013.01); *H02J 3/24* (2013.01); *H02J 13/00* (2013.01); *H02J 13/0079* (2013.01); *Y04S 10/60* (2013.01)

(58) Field of Classification Search
CPC .................. H02J 3/14; H02J 3/12; H02J 3/00
See application file for complete search history.

(56) References Cited

U.S. PATENT DOCUMENTS

| 2014/0343744 A1* | 11/2014 | Mansfield | H02J 3/14 700/297 |
| 2015/0123475 A1* | 5/2015 | Premm | H02J 3/12 307/24 |
| 2015/0153153 A1* | 6/2015 | Premm | H02J 3/00 700/298 |

FOREIGN PATENT DOCUMENTS

| JP | H07-099742 A | 4/1995 |
| JP | 2001-352679 A | 12/2001 |

(Continued)

OTHER PUBLICATIONS

International Search Report for WO 2016/035399 A1, dated Aug. 11, 2015.

*Primary Examiner* — Mohamed Charioui
*Assistant Examiner* — Christine Y Liao
(74) *Attorney, Agent, or Firm* — Volpe and Koenig, P.C.

(57) ABSTRACT

A system stability monitoring device monitors the stability of a power system and is equipped with: a storage unit for storing spot information indicating the positional relationship between a plurality of measurement spots in the power system; a receiving unit for receiving time-series measurement information measured by a measuring device provided at each of the measurement spots; and a calculation unit for detecting the frequency components of the power fluctuation from the measurement information, selecting, based on the frequency components, measurement spot group candidates that are measurement spots among the plurality of measurement spots, obtaining the electrical distances between the measurement spot group candidates on the basis of the spot information, and categorizing the measurement spot group (Continued)

candidates into at least one measurement spot group on the basis of the electrical distances.

12 Claims, 12 Drawing Sheets

(56) References Cited

FOREIGN PATENT DOCUMENTS

| JP | 2009-077589 A | 4/2009 |
|---|---|---|
| JP | 2013-219853 A | 10/2013 |

* cited by examiner

[Fig. 1]
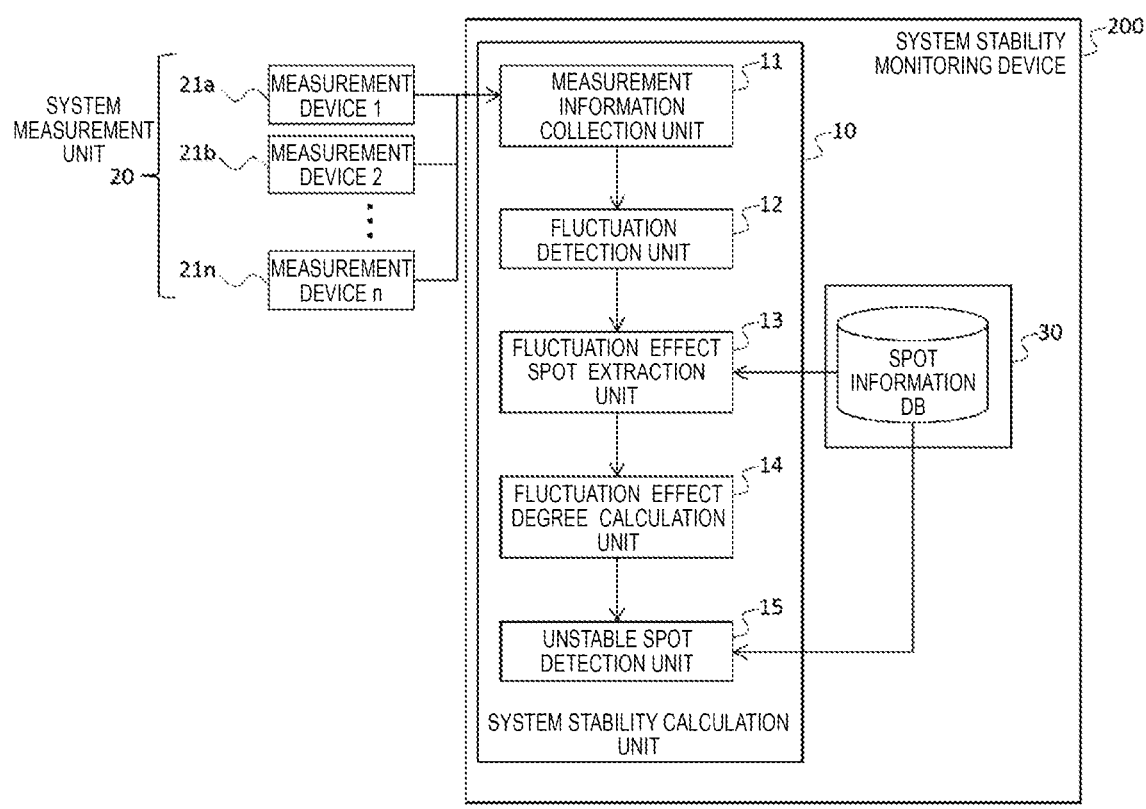

[Fig. 2]
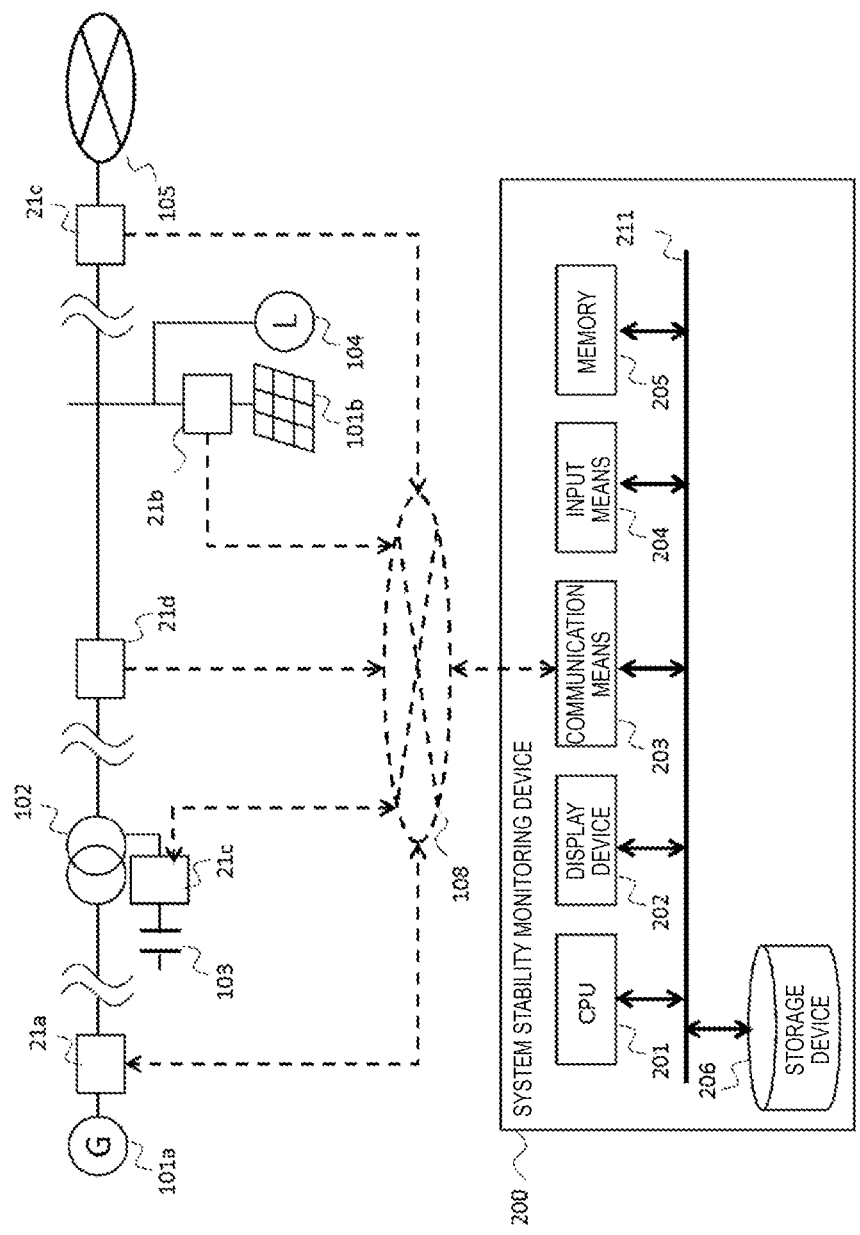

[Fig. 3]

SYSTEM STABILITY DETERMINATION PROCESSING

Start
↓
CALCULATE DETECTION FLUCTUATION INFORMATION FROM MEASUREMENT INFORMATION OF PLURALITY OF SPOTS — S31
↓
EXTRACT PLURALITY OF RELATED MEASUREMENT SPOTS, BASED ON DETECTION FLUCTUATION INFORMATION AND SPOT INFORMATION — S32
↓
CALCULATE DEGREE OF EFFECT ON FLUCTUATION BY USING REGION FLUCTUATION INFORMATION OF PLURALITY OF RELATED MEASUREMENT SPOTS — S33
↓
DETECT UNSTABLE SPOT BY USING DEGREE OF EFFECT ON FLUCTUATION — S34
↓
End

[Fig. 4]

DETECTION FLUCTUATION INFORMATION TABLE

| FLUCTUATION NAME MEASUREMENT SPOT | No. | FLUCTUATION FREQUENCY | ATTENUATION COEFFICIENT | AMPLITUDE | INITIAL PHASE |
|---|---|---|---|---|---|
| PMU1 | 1 | 0.18 | −2.0 | 120 | 10 |
| PMU1 | 2 | 0.65 | −0.5 | 80 | 30 |
| PMU1 | ⋮ | ⋮ | ⋮ | ⋮ | ⋮ |
| PMU2 | 1 | 0.19 | −1.9 | 90 | 15 |
| ⋮ | ⋮ | ⋮ | ⋮ | ⋮ | ⋮ |

[Fig. 5]

FLUCTUATION EFFECT SPOT EXTRACTION PROCESSING

```
Start
  ↓
CATEGORIZE FLUCTUATION INFORMATION IN EACH
FLUCTUATION FREQUENCY                        — S71
  ↓
CALCULATE DISTANCE BETWEEN MEASUREMENT
SPOTS                                        — S72
  ↓
PERFORM CATEGORIZATION BY USING DISTANCES
BETWEEN MEASUREMENT SPOTS                    — S73
  ↓
End
```

[Fig. 6]

FREQUENCY FLUCTUATION INFORMATION TABLE

| FLUCTUATION FREQUENCY | FLUCTUATION NAME | | ATTENUATION COEFFICIENT | AMPLITUDE | INITIAL PHASE |
|---|---|---|---|---|---|
| | MEASUREMENT SPOT | No. | | | |
| 0.18 | PMU1 | 1 | −2.0 | 120 | 10 |
| | PMU2 | 1 | −1.9 | 90 | 15 |
| | ⋮ | ⋮ | ⋮ | ⋮ | ⋮ |
| 0.65 | PMU1 | 2 | −0.5 | 80 | 30 |
| | ⋮ | ⋮ | ⋮ | ⋮ | ⋮ |

[Fig. 7]

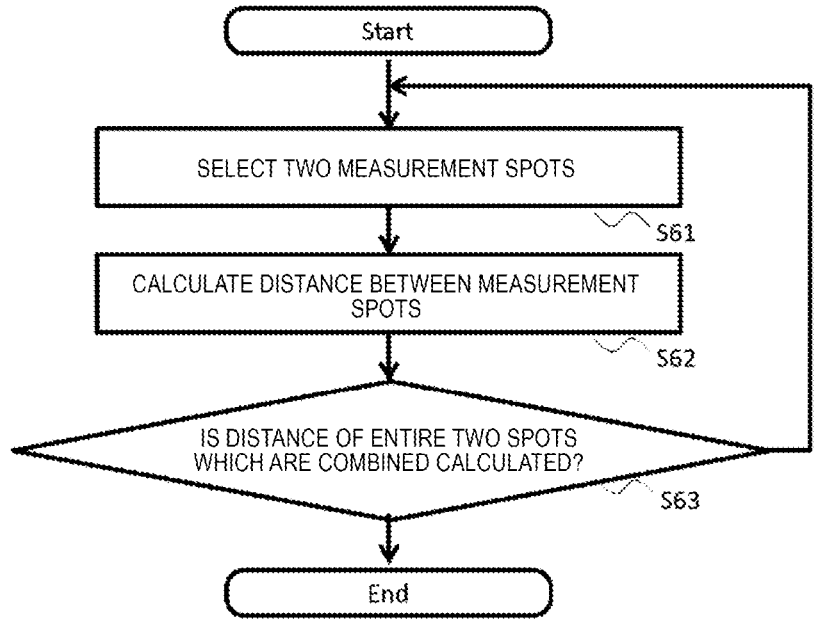

MEASUREMENT SPOT-TO-SPOT DISTANCE CALCULATION PROCESSING

[Fig. 8]

NODE INFORMATION

| NODE NAME | POSITIONAL INFORMATION | | POWER GENERATOR | | | LOAD | | | PHASE ADJUSTMENT APPARATUS | | |
|---|---|---|---|---|---|---|---|---|---|---|---|
| | LATITUDE | LONGITUDE | NAME | TYPE | RATED CAPACITY | NAME | TYPE | RATED CAPACITY | NAME | TYPE | RATED CAPACITY |
| A | 36.5 | 138.2 | G1 | THERMAL POWER | 100 | -- | -- | -- | -- | -- | -- |
| B | 37.7 | 140.5 | G2 | WIND POWER | 200 | -- | -- | -- | -- | -- | -- |
| ⋮ | ⋮ | ⋮ | ⋮ | ⋮ | ⋮ | ⋮ | ⋮ | ⋮ | ⋮ | ⋮ | ⋮ |
| AA | 35.7 | 139.8 | -- | -- | -- | L1 | HOUSE | 1000 | -- | -- | -- |
| BB | 35.0 | 139.5 | -- | -- | -- | L2 | FACTORY | 2000 | -- | -- | -- |
| ⋮ | ⋮ | ⋮ | ⋮ | ⋮ | ⋮ | ⋮ | ⋮ | ⋮ | ⋮ | ⋮ | ⋮ |
| AAA | 36.3 | 139.0 | -- | -- | -- | -- | -- | -- | D1 | SC | 10 |
| BBB | 35.6 | 138.6 | -- | -- | -- | -- | -- | -- | D2 | ShR | 20 |
| ⋮ | ⋮ | ⋮ | ⋮ | ⋮ | ⋮ | ⋮ | ⋮ | ⋮ | ⋮ | ⋮ | ⋮ |

[Fig. 9]

POWER TRANSMISSION WIRE INFORMATION

| POWER TRANSMISSION WIRE NAME | BOTH END NODE | | NORMAL PHASE RESISTANCE R | NORMAL PHASE REACTANCE X | NORMAL PHASE CAPACITANCE C |
|---|---|---|---|---|---|
| a | A | B | 0.01 | 0.2 | 0.1 |
| b | B | C | 0.02 | 0.5 | 0.2 |
| ⋮ | ⋮ | ⋮ | ⋮ | ⋮ | ⋮ |

[Fig. 10]

MEASUREMENT SPOT INFORMATION

| MEASUREMENT SPOT 1 | | MEASUREMENT SPOT 2 | | DISTANCE BETWEEN MEASUREMENT SPOTS |
|---|---|---|---|---|
| MEASUREMENT SPOT NAME | NODE NAME | MEASUREMENT SPOT NAME | NODE NAME | |
| PMU1 | A | PMU2 | B | 15 |
| PMU1 | A | PMU3 | C | 40 |
| ⋮ | ⋮ | ⋮ | ⋮ | ⋮ |

[Fig. 11]

REGION FLUCTUATION INFORMATION TABLE

| FLUCTUATION No. | FLUCTUATION FREQUENCY | MEASUREMENT SPOT | ATTENUATION COEFFICIENT | AMPLITUDE | INITIAL PHASE |
|---|---|---|---|---|---|
| 1 | 0.18 | PMU1 | −2.0 | 120 | 10 |
| | | PMU3 | −1.0 | 30 | −10 |
| | | ⋮ | ⋮ | ⋮ | ⋮ |
| 2 | 0.65 | PMU1 | −0.5 | 80 | 30 |
| | | ⋮ | ⋮ | ⋮ | ⋮ |
| 3 | 0.18 | PMU2 | −1.9 | 90 | 15 |
| | | ⋮ | ⋮ | ⋮ | ⋮ |

[Fig. 12]
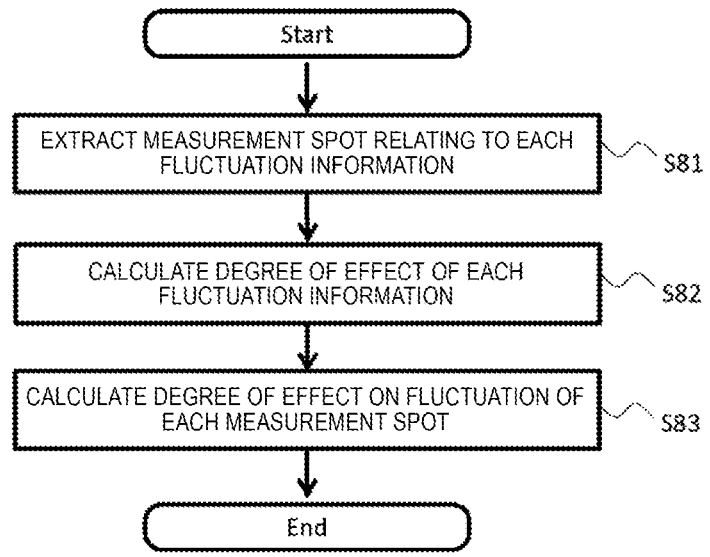
[Fig. 13]
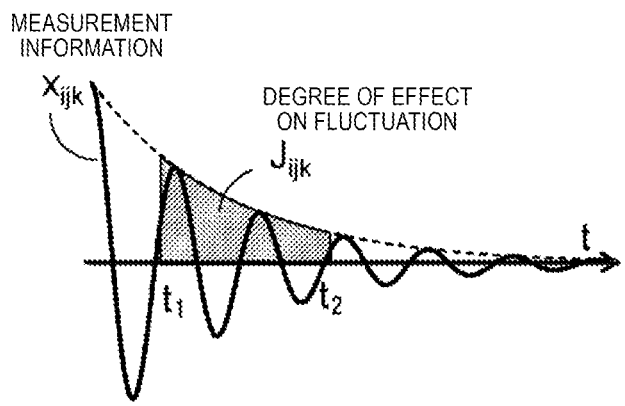

[Fig. 14]

PAST FLUCTUATION INFORMATION

| INSTANCE No. | INSTANCE DETAILS ||||| FLUCTUATION No. | FLUCTUATION FREQUENCY | DEGREE OF EFFECT ON FLUCTUATION | MEASUREMENT SPOT | ATTENUATION COEFFICIENT | AMPLITUDE | INITIAL PHASE |
|---|---|---|---|---|---|---|---|---|---|---|---|---|
| | TIME | DATE-DAY | MONTH-SEASON | EVENT | | | | | | | | |
| 1 | 8:00 - 10:00 | SATURDAY - SUNDAY | MARCH - MAY | NO EVENT | 1-1 | 0.18 | 180 | PMU1 | -2.0 | 120 | 10 |
| | | | | | 1-2 | 0.65 | 160 | PMU3 | -1.0 | 30 | -10 |
| | | | | | | | | ... | ... | ... | ... |
| | | | | | | | | PMU2 | -0.5 | 80 | 30 |
| | | | | | | | | ... | ... | ... | ... |
| | | | | | 1-3 | 0.18 | 100 | PMU2 | -1.9 | 90 | 15 |
| | | | | | ... | ... | ... | ... | ... | ... | ... |
| 2 | 12:00 - 14:00 | MONDAY - FRIDAY | JULY - SEPTEMBER | NODE AA 1LG | 2-1 | 0.35 | 260 | PMU2 | -0.3 | 90 | 20 |
| | | | | | | | | PMU3 | -0.5 | 60 | 30 |
| | | | | | | | | ... | ... | ... | ... |
| | | | | | 2-2 | 0.18 | 160 | PMU3 | -1.0 | 70 | 20 |
| | | | | | ... | ... | ... | ... | ... | ... | ... |
| ... | ... | | | | ... | ... | ... | ... | ... | ... | ... |

[Fig. 15]
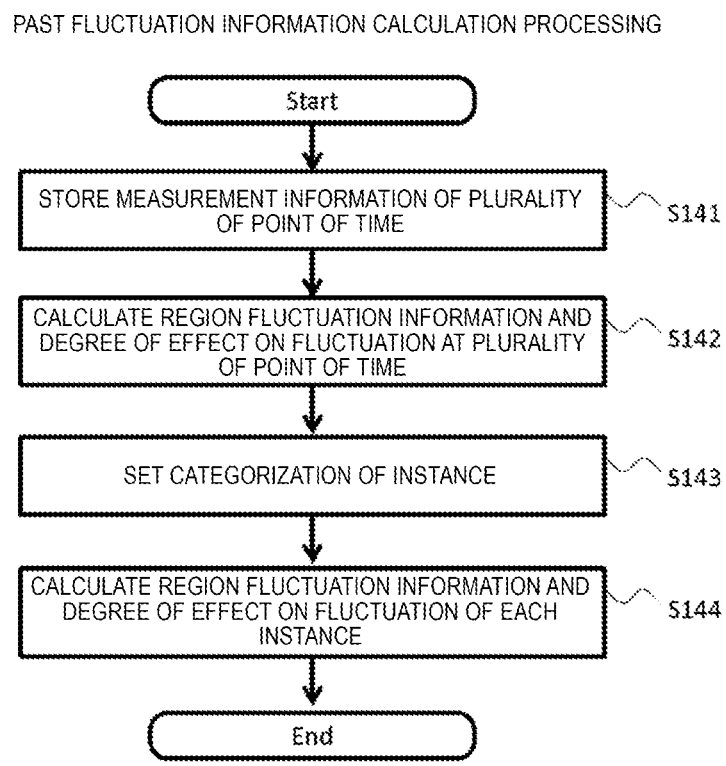

[Fig. 16]
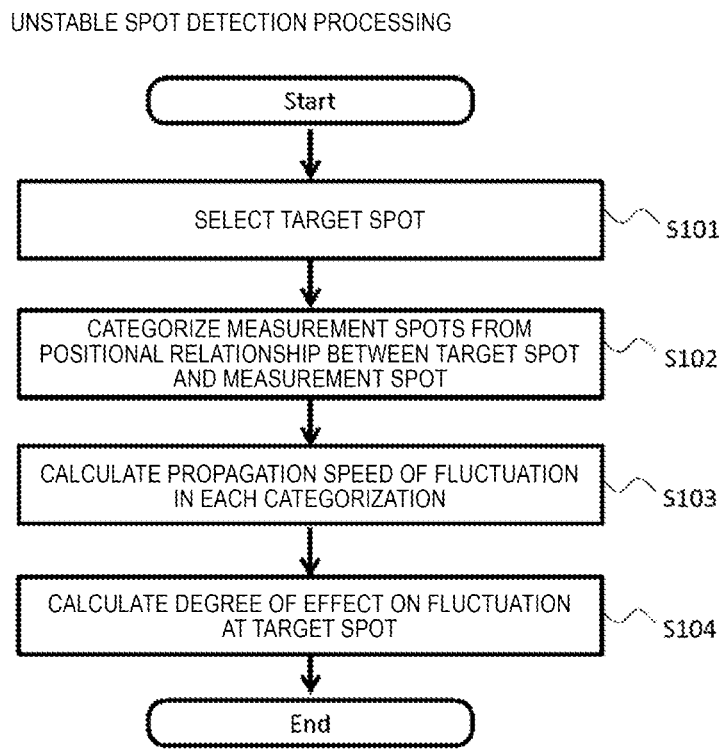

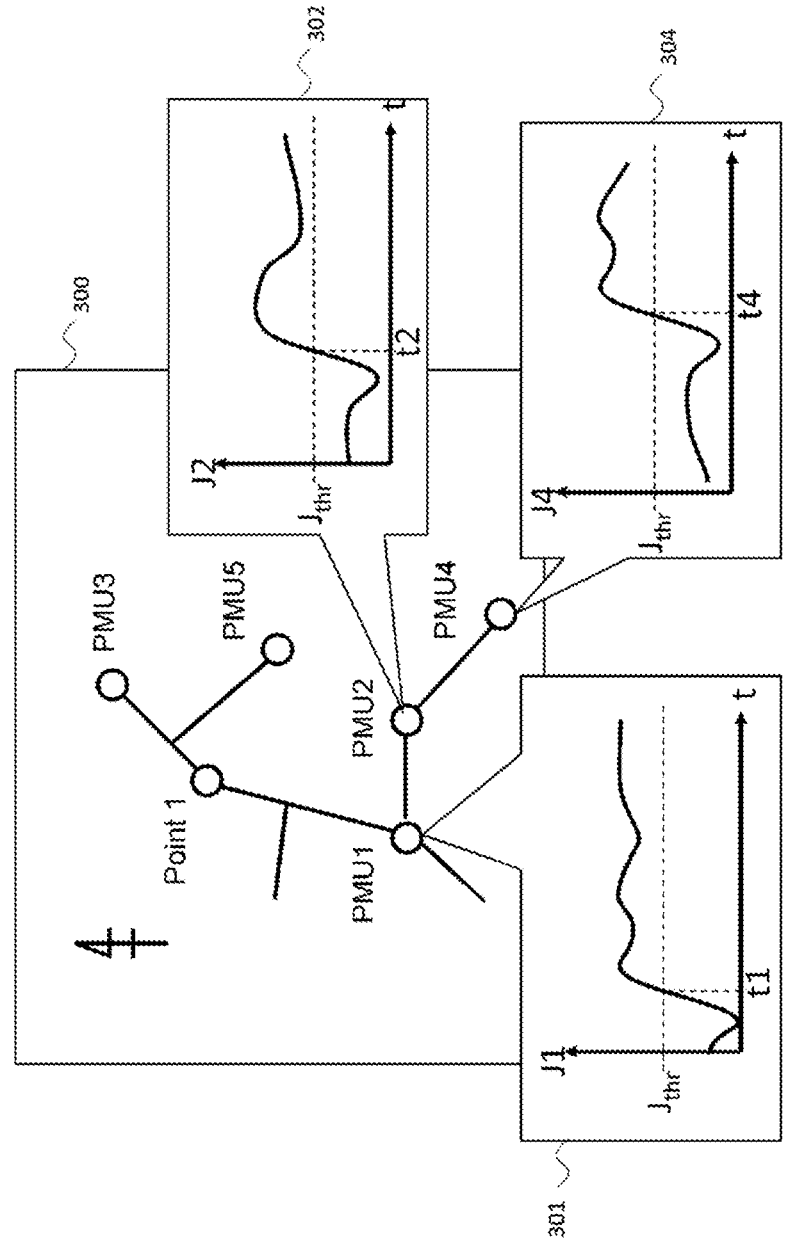
[Fig. 17]

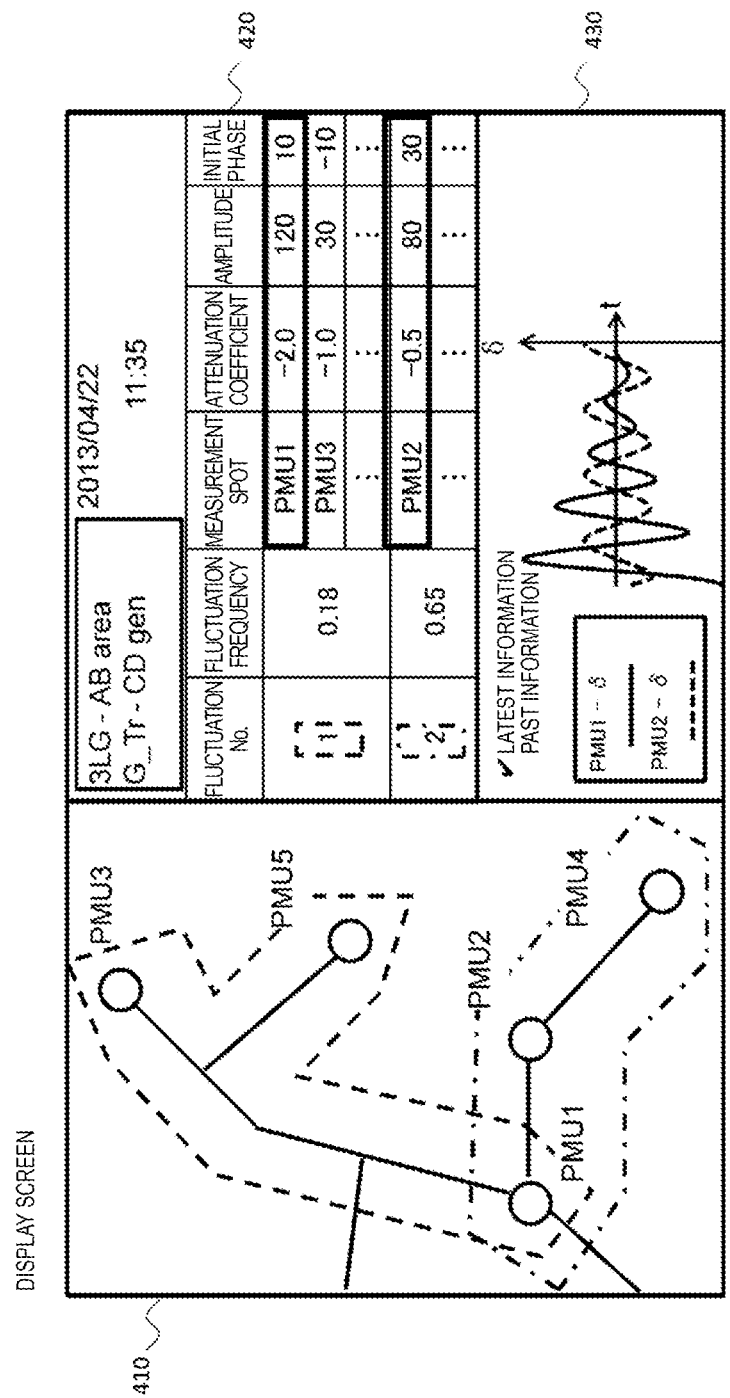
[Fig. 18]

SYSTEM STABILITY MONITORING DEVICE AND SYSTEM STABILITY MONITORING SYSTEM

TECHNICAL FIELD

The present invention relates to a system stability monitoring device.

BACKGROUND ART

A power system is configured by many power generators, loads, power transmission and distribution apparatuses, and control devices. Slight disturbance due to load variation, system switching, and the like is added to the power system in a normal state. When an accident such as ground fault or a short circuit of a system occurs, large disturbance is added to the power system. Power fluctuation with a plurality of fluctuation components is caused by the disturbance.

In a case where fluctuation mode components are small or are attenuated at a high speed, the system fluctuation is retained in a sufficiently small range after the disturbance occurs, and thus, the power system is in a stable state. However, in a case where the fluctuation is large or attenuation is continued or distributed without convergence, a power generator stops or wide power failure occurs, as a result. Accordingly, there is a possibility that stable management cannot be performed.

There is a tendency that as a power system scale increases, power source capacity increases, and remoting, localization, lengthening of a power transmission wire according to the localization, and a heavy flow are performed. Since effects according to the change occur in a direction in which stability of a power system decreases, there is a possibility that knock-on effects to a large-scale power-off and wide power failure being started from step-out of a power generator at the time of system failure increases.

Accordingly, an on-line system stability evaluating method of normally monitoring system stability and of preventing and predicting spreading to wide power failure in advance is required.

Recently, a phase detector PMU (Phasor Measurement Unit) which measures a bus voltage phase angle of a power system in an approximately real time by using synchronous measurement which uses a GPS (Global Positioning System) has been used. It is possible to grasp a power fluctuation phenomenon in real time by using an on-line measurement value such as a system bus voltage measured by the phase detector PMU.

A system stability monitoring technology that an operator which manages a power system uses to monitor a state of the system has been developed on the basis of the aforementioned background. For example, PTL 1 describes "is characterized by including a phase measuring device that measures an amount and a phase angle of a system bus voltage of each subsystem provided in each of a plurality of subsystems categorized such that analysis of a power fluctuation mode of a power system can be performed, data input processing means for inputting an amount and a phase angle of a system bus voltage for each subsystem which is measured by the phase measuring device in each subsystem other than a reference in time series by using any one of the plurality of subsystems as the reference and for obtaining phase angle deviation and frequency deviation which use a phase angle and a frequency of a reference subsystem as a reference on the basis of the phase angle, an observation data storage unit that stores phase angle deviation and frequency deviation of a system bus voltage for each subsystem obtained by the data input processing means as observation data, observation data take-out means for randomly taking out observation data of each subsystem from a plurality of subwindows which have widths smaller than a width of a main window with a predetermined same period width with respect to observation data of the observation data storage unit and have size different from each other, state transition equation writing means for writing a state transition equation which uses phase angle deviation and frequency deviation of observation data taken out by the observation data take-out means as state variables in each subwindow, characteristic value calculation means for obtaining a characteristic value of a coefficient matrix of the state transition equation in each subwindow written by the state transition equation writing means, and output processing means for displaying and outputting a distribution of a characteristic value group in each subwindow calculated by the characteristic value calculation means as a complex plane".

CITATION LIST

Patent Literature

PTL 1: JP-A-2009-077589

SUMMARY OF INVENTION

Technical Problem

Recently, renewable energy which is typical of solar light power generation or wind power generation has been introduced into a system in large quantities. The renewable energy brings a rapid and unimaginable power generation output variation, and as a result, there is a possibility that system characteristics change greatly. For example, in a case where a wind speed exceeds a certain threshold value, a cutout operation is performed in which wind power generation automatically stops for keeing stability of an apparatus and power Generation output becomes zero. Such a phenomenon occurs more frequently, compared with a short circuit and ground fault occurring in a system of the related art, and in a case where power generators are densely provided at close areas, it is anticipated that failures can occur simultaneously in a plurality of power generators.

There is a possibility that as the amount of introduction of renewable energy increases, an impact of the rapid output variation event on a system increases, and a wide fluctuation mode is destabilized. In order to cope with this, rapid and accurate stability determination is required in an intermediate region of approximately several seconds to dozen seconds shortly after the output variation event.

In order to perform the rapid stability determination, it is necessary to further reduce an input data length of a measured value than that of the related art. However, in a case where the input data is reduced, effects of noise on a fluctuation mode of a system increases relatively and the fluctuation mode is hard to be accurately detected. In addition, frequency resolution is reduced by trade-off with a length of the input data, according to uncertainty principle of fourier transform, and thus, is difficult to separately detect a plurality of fluctuation modes with close frequencies.

Hence, in a case where the plurality of fluctuation modes with close fluctuation frequencies exist at the same time, a plurality of fluctuations are mutually offset depending on a measurement spot, and there is a possibility that a spot occurs in which an accurate fluctuation mode is hard to be detected. In this case, it is difficult for the technology described in PTL 1 to perform rapid and accurate stability determination.

An object of the invention is to perform rapid and accurate stability determination, in a case where a plurality of fluctuation components with close fluctuation frequencies exist at the same time.

Solution to Problem

In order to solve the aforementioned problems, a system stability monitoring device according to an aspect of the invention is a system stability monitoring device that monitors stability of a power system, and includes a storage unit that stores spot information indicating a positional relationship between a plurality of measurement spots in the power system; a receiving unit that receives time-series measurement information which is measured by a measuring device that is provided at each of the plurality of measurement spots; and a calculation unit that detects frequency components of power fluctuation from the measurement information, selects measurement spot group candidates which are measurement spots among the plurality of measurement spots on the basis of the frequency components, obtains electrical distances between the measurement spot group candidates on the basis of the spot information, and categorizes the measurement spot group candidates into at least one measurement spot group on the basis of the electrical distances.

BRIEF DESCRIPTION OF DRAWINGS

FIG. 1 illustrates a functional configuration of a system stability monitoring device according to the present embodiment.

FIG. 2 illustrates a configuration of a system stability monitoring system according to the present embodiment.

FIG. 3 illustrates system stability determination processing.

FIG. 4 illustrates a detection fluctuation information table.

FIG. 5 illustrates fluctuation effect spot extraction processing.

FIG. 6 illustrates a frequency fluctuation information table.

FIG. 7 illustrates measurement spot-to-spot distance calculation processing.

FIG. 8 illustrates node information.

FIG. 9 illustrates power transmission wire information.

FIG. 10 illustrates measurement spot information.

FIG. 11 illustrates a region fluctuation information table.

FIG. 12 illustrates fluctuation effect degree calculation processing.

FIG. 13 illustrates a concept of the fluctuation effect degree calculation processing.

FIG. 14 illustrates a past fluctuation information table.

FIG. 15 illustrates past fluctuation information calculation processing.

FIG. 16 illustrates unstable spot detection processing.

FIG. 17 illustrates a conceptual diagram of fluctuation propagation calculation processing.

FIG. 18 illustrates a display screen.

DESCRIPTION OF EMBODIMENTS

Hereinafter, an embodiment of the invention will be described. Meanwhile, the following description is only an example, and the invention itself is not intended to be limited to the following specific contents.

Embodiments of the invention will be described hereinafter with reference to the drawings.

FIG. 1 illustrates a functional configuration of a system stability monitoring device according to the present embodiment.

A system stability monitoring device 200 according to the present embodiment includes a system stability calculation unit 10 and an information storage unit 30. The system stability calculation unit 10 is connected to a system measuring unit 20. The system measuring unit 20 measures measurement information of a plurality of spots. The information storage unit 30 includes a spot information DB (database).

Hereinafter, in a case where it is not necessary to distinguish elements by using alphabets of a symbol, the alphabets of a symbol can be omitted.

The system stability calculation unit 10 includes a measurement information collection unit 11, a fluctuation detection unit 12, a fluctuation effect spot extraction unit 13, a fluctuation effect degree calculation unit 14, an unstable spot detection unit 15.

The measurement information collection unit 11 receives measurement information (system state quantity) measured by the system measuring unit 20 through an information communication network and collects the measurement information.

The fluctuation detection unit 12 calculates detection fluctuation information indicating fluctuation components which are frequency components of power fluctuation with respect to measurement information of a specific type (measurement type) at each spot, based on the measurement information collected by the measurement information collection unit 11.

The fluctuation effect spot extraction unit 13 selects a measurement spot group candidate which is one measurement spot of a plurality of measurement spots based on the frequency components of the detection fluctuation information, acquires an electrical distance between the measurement spot group candidates based on the spot information DB, categorizes the measurement spot group candidates into at least one measurement spot group based on the electrical distance, and generates region fluctuation information from the detection fluctuation information of the measurement spot group. For example, in a case where fluctuation frequencies which look the same at two measurement spots are detected, if an electrical distance between two measurement spots is short, the fluctuation effect spot extraction unit 13 recognizes the two measurement spots as one measurement spot group, and if the electrical distance between the two measurement spots is long, the fluctuation effect spot extraction unit 13 recognizes the two measurement spots as two measurement spot groups.

The fluctuation effect degree calculation unit 14 calculates a degree of effect on fluctuation indicating the extent of effect of fluctuation components of the region fluctuation information on stability of a system in each region fluctuation information by using the region fluctuation information which is calculated by the fluctuation detection unit 12.

The unstable spot detection unit 15 detects a spot which is determined to be unstable for now or a spot which is predicted to be unstable in future from a plurality of measurement spots by using the degree of effect on fluctuation which is calculated by the fluctuation effect degree calculation unit 14.

The system measuring unit 20 measures measurement information on measurement spots in the system, and transmits the calculated measurement information to the measurement information collection unit 11. The measurement information includes at least one type of an active power flow, a reactive power flow, a system voltage, a system current, and a voltage phase. The system measuring unit includes measuring devices 21a, 21b, . . . , and 21n which are respectively disposed at a plurality of measurement spots. The measuring device 21 is, for example, a PMU or the like, regularly measures power, and transmits time-series measurement information.

The information storage unit 30 includes the spot information DB indicating connection information on system elements which are linked to a power system. The spot information DB includes some of information indicating characteristics of system elements (power apparatuses) which are connected to each node in a system such as a power generator which is linked to the vicinity of the measurement spot, a load, a phase adjustment apparatus, information indicating impedance or the like of a power transmission wire which is connected between each node, and information indicating a positional relationship between latitudes and longitudes of a plurality of measurement spots, a topology, or the like. Thereby, it is possible to calculate an electrical distance between measurement spots, and to categorize the measurement spots, according to an electrical distance.

FIG. 2 illustrates a configuration of a system stability monitoring system according to the present embodiment.

As illustrated in FIG. 2, the system stability monitoring system according to the present embodiment includes a power generator 101, a transforming station 102, a phase adjustment apparatus 103, a power load 104, an external power system 105, the measuring devices 21a, 21b, . . . , an information communication network 108, and a system stability monitoring device 200. Hereinafter, a power system including the power generator 101, the transforming station 102, the phase adjustment apparatus 103, the power load 104, and the measuring devices 21a, 21b, . . . can be referred to as a self-system.

The power generator 101 is a power generator which generates power, and is a power generator which generates power by using a power generating method including any one of thermal power generation, hydraulic power generation, nuclear power generation, solar light power generation, wind power generation, biomass power generation, and tidal flow power generation. A power generator 101a is a large-scale power generator which includes thermal power generation, hydraulic power generation, nuclear power generation, or the like, and which are provided on a high voltage side of the transforming station 102 in a power system, and transmits a system state quantity including the amount of power generation to the system stability monitoring device 200 through the measuring device 21a and the information communication network 108. In addition, the power generator 101a receives control command information which is transmitted from the system stability monitoring device 200 through the measuring device 21a and the information communication network 108, and changes the system state quantity including the amount of power generation in response to the control command information. A power generator 101b is a medium-scale power generator including solar light power generation, wind power generation, cogeneration, or the like which is provided on a low voltage side of the transforming station 102 in the power system, and transmits system state quantity including the amount of power generation to the system stability monitoring device 200 through the measuring device 21b and the information communication network 108.

The transforming station 102 is provided between power transmission wires in the power system, changes a voltage value of power which is transmitted from a high voltage side where the power generator 101a that is a large-scale power generator is provided, and transmits the voltage value to a low voltage side where the power load 104 is provided. The transforming station 102 is connected to the phase adjustment apparatus 103 such as a power capacitor or a shunt reactor, The phase adjustment apparatus 103 is an apparatus which controls a voltage distribution in the power system by changing reactive power in the power system, and includes a power capacitor, a shunt reactor, a STATCOM (static synchronous compensator), an SVC (static var compensator), and the like. The phase adjustment apparatus 103 receives the control command information which is transmitted from the system stability monitoring device 200 through the measuring device 21c and the information communication network 108, and changes the system state quantity including the amount of power generation in response to the control command information.

The power load 104 is a facility which includes a motor which consumes power, a light fixture, and the like, and represents a facility such as a house, a factory, or a building.

The external power system 105 is an external power system which is not controlled by the system stability monitoring device 200, and is connected to the self-system through a link wire.

The measuring devices 21a, 21b, . . . include sensors which measure the system state quantity such as the amount power generation of the power generator 101a, the amount of phase adjustment of the phase adjustment apparatus 103, a flow value of a power transmission wire, and a voltage value, and transmits the measured system state quantity to the system stability monitoring device 200 through the information communication network 108.

The information communication network 108 is a network which can transmit data in both directions. The information communication network 108 is, for example, a wired network, a wireless network, or a combination of those. The information communication network 108 may be the so-called Internet, and may be a private network.

The system stability monitoring device 200 is a device for realizing the system stability monitoring function illustrated in FIG. 1. The system stability monitoring device 200 receives the system state quantity which is measured by the measuring devices 21a, 21b, through the information communication network 108. In addition, the system stability monitoring device 200 transmits control command information which is calculated by using the transmitted system state quantity of the system and information stored in the inside to the measuring device 21 through the information communication network 108.

An internal configuration of the system stability monitoring device 200 includes a CPU (central processing unit) 201, a display device 202, communication means 203, input means 204, a memory 205, and a storage device 206 which are connected to a bus 211. The CPU 201 executes a calculation program stored in the storage device 206, performs calculation of a system state, generation of a control signal, generation of image data, and the like, and displays the image data on the display device 202. The memory 205 is a memory which temporarily stores image data for display, calculation result data of the system state, and the like, and is, for example, a RAM (random access memory) or the like. The communication means 203 acquires system state quantity such as a flow value or a voltage value from the measuring device 21 through the information communication network 108. The measurement information collection unit 11 receives time series measurement information which is measured by a plurality of measuring devices 21 by using the communication means 203.

A user (manager) of the system stability monitoring device 200 can set or change parameters such as various threshold values through a predetermined interface of the input means 204, and can appropriately set an operation of the system stability monitoring device 200 of the self-system. In addition, the user can select a type of data that the user wants to confirm through the predetermined interface of the input means 204, and can display the selected data on the display device 202.

The storage device 206 retains various programs and data. The storage device 206 is, for example, an HDD (hard disk drive), a flash memory, or the like. The storage device 206 retains, for example, a program which can perform various functions that will be described later, data, or the like. The program and the data which are stored in the storage device 206 are read into the CPU 201 to be executed if necessary. The storage device 206 realizes the information storage unit 30, and stores various databases (DB).

Here, system stability determination processing which is performed by the system stability monitoring device 200 will be described.

FIG. 3 illustrates the system stability determination processing.

First, the fluctuation detection unit 12 calculates detection fluctuation information by using measurement information of a plurality of spots which are measured by the system measuring unit 20 (S31). Here, the measurement information of the plurality of spots which are measured by the system measuring unit 20 includes information of at least one measurement type of an active power flow, a reactive power flow, a system voltage, a system current, and a voltage phase. The system stability monitoring device 200 may perform the system stability determination processing with respect to a specific one measurement type, and may perform the system stability determination processing with respect to a plurality of measurement types. In order to calculate the detection fluctuation information of the present processing, at least one of algorithms which are used for frequency analysis, that is, algorithms which use, for example, furrier analysis, wavelet analysis, a Purony method, a Matrix Pencil method, and an HTLS (Hankel Total Least Square) method is applied.

Hereinafter, a fluctuation information calculation algorithm which is performed by using the purony method will be described.

A analysis window width data number N and a mode order number n are set in advance.

The fluctuation detection unit 12 calculates a matrix $a=(a_1, a_2, \ldots, a_n)^T$ from following (Expression 1) to (Expression 4) by using input data $y(k)$ ($k=0, 1, \ldots, N-1$) which is measurement information of each spot. However, "T" of a superscripted letter denotes a transposed matrix and "−1" of a superscripted letter denotes an inverse matrix.

$$a = (X^T X)^{-1} X^T y \qquad \text{[Expression 1]}$$

$$a = \begin{bmatrix} a_1 \\ a_2 \\ \vdots \\ a_n \end{bmatrix} \qquad \text{[Expression 2]}$$

$$X = \begin{bmatrix} y(n-1) & y(n-2) & \ldots & y(0) \\ y(n) & y(n-1) & \ldots & y(1) \\ \vdots & \vdots & \ddots & \vdots \\ y(N-2) & y(N-3) & \ldots & y(N-n-1) \end{bmatrix} \qquad \text{[Expression 3]}$$

$$y = \begin{bmatrix} y(n) \\ y(n+1) \\ \vdots \\ y(N-1) \end{bmatrix} \qquad \text{[Expression 4]}$$

The fluctuation detection unit 12 inserts $a_1, a_2, \ldots, a_n$ which are calculated from (Expression 1) to (Expression 4) into following (Expression 5). Thereafter, the fluctuation detection unit 12 inserts $Z_i$ which is expressed by a form of (Expression 6) and (Expression 7) into Z of (Expression 5), and calculates a unique value $\lambda_i$, an attenuation coefficient (attenuation rate) $\sigma_i$ [1/sec], and a fluctuation frequency fi [Hz]=$\omega_i/2\pi$. Here, $\Delta t$ denotes a sampling cycle.

(Expression 5) is an $n^{th}$ order polynomial (characteristic equation) which solves $Z_i$, and each of n $Z_i$s, n$\sigma_i$s are solved to be obtained.

$$Z^n - (a_1 Z^{n-1} + a_2 Z^{n-2} + \ldots + a_n Z^0) = 0 \qquad \text{[Expression 5]}$$

$$Z_i = \exp(\lambda_i \Delta t) \qquad \text{[Expression 6]}$$

$$\lambda_i = \sigma_i + \omega_i j \qquad \text{[Expression 7]}$$

The fluctuation detection unit 12 calculates a matrix $b=(B_1, B_2, \ldots, B_n)^T$ from following (Expression 8) to (Expression 11) by using input data $y(k)$ ($k=0, 1, \ldots, N-1$) and the calculated $Z_i$ ($i=1, 2, \ldots, n$).

$$b = (Z^T Z)^{-1} Z^T w \qquad \text{[Expression 8]}$$

$$b = \begin{bmatrix} B_1 \\ B_2 \\ \vdots \\ B_n \end{bmatrix} \qquad \text{[Expression 9]}$$

$$Z = \begin{bmatrix} Z_1^0 & Z_2^0 & \ldots & Z_n^0 \\ Z_1^1 & Z_2^1 & \ldots & Z_n^1 \\ \vdots & \vdots & \ddots & \vdots \\ Z_1^{N-1} & Z_2^{N-1} & \ldots & Z_n^{N-1} \end{bmatrix} \qquad \text{[Expression 10]}$$

$$w = \begin{bmatrix} y(0) \\ y(1) \\ \vdots \\ y(N-1) \end{bmatrix} \qquad \text{[Expression 11]}$$

The fluctuation detection unit 12 obtains an absolute value $R_i$ and a polar angle $\theta_i$ which are expressed in (Expression 12) from $B_1, B_2, \ldots, B_n$ calculated by using (Expression 8) to (Expression 11). At this time, the absolute value $R_i$ means an amplitude and the polar angle $\theta_i$ means an initial phase.

$$B_i = R_i \exp(j\theta_i) \qquad \text{[Expression 12]}$$

By the aforementioned processing, the detection fluctuation information including a fluctuation frequency, an attenuation coefficient, an amplitude, and an initial phase is obtained. As the detection fluctuation information includes one of the fluctuation frequency, the attenuation frequency, and the amplitude, it is possible to represent fluctuation components of each measurement spot. Future fluctuation components can be predicted by using the detection fluctuation information.

FIG. 4 illustrates a detection fluctuation information table.

The detection fluctuation information table includes entry for each piece of detection fluctuation information. Entry corresponding to one piece of detection fluctuation information includes detection fluctuation identification information (fluctuation name in the figure) for identifying the detection fluctuation information and fluctuation characteristics indicating characteristics of fluctuation denoted by the detection fluctuation information. The detection fluctuation identification information includes a name of a measurement spot corresponding to input data and a detection fluctuation information number (No.) indicating a mode of the detection fluctuation information. In a case where the detection fluctuation information is calculated by using the aforementioned purony, detection fluctuation information having the same number as a mode order number n is calculated with respect to one type of measurement information of one measurement spot. Hence, in a case where measurement information of q types ($q \geq 1$) is used at each spot of p spots ($p \geq 1$), ($n \times p \times q$) pieces of detection fluctuation information are calculated. Fluctuation characteristics include the calculated fluctuation frequency, the attenuation coefficient, the amplitude, and the initial phase.

Subsequently, the fluctuation effect spot extraction unit 13 performs fluctuation effect spot extraction processing of extracting a plurality of measurement spots relating to each of fluctuation components that are determined to be the same, based on the detection fluctuation information and the spot information DB stored in the information storage unit 30 (S32).

FIG. 5 illustrates the fluctuation effect spot extraction processing.

First, a plurality of pieces of the detection fluctuation information which is calculated by the fluctuation detection unit 12 are categorized by a fluctuation frequency, and the results are retained in the information storage unit 30 as frequency fluctuation information (S71).

FIG. 6 illustrates a frequency fluctuation information table.

The frequency fluctuation information table includes entry for each piece of frequency fluctuation information. Entry corresponding to one piece of frequency fluctuation information includes a fluctuation frequency of fluctuation components corresponding to the frequency fluctuation information, the detection fluctuation identification information (fluctuation name in the figure), and fluctuation characteristics indicating characteristics of at least one piece of detection fluctuation information having a fluctuation frequency close to the fluctuation frequency. The detection fluctuation identification information is the same as detection fluctuation identification information of the detection fluctuation information. The fluctuation characteristics include the attenuation coefficient, the amplitude, and the initial phase. In an example of the frequency fluctuation information table, the frequency fluctuation information having a fluctuation frequency close to 0.18 includes detection fluctuation information of No. 1 at a measurement spot PMU1 and detection fluctuation information of No. 1 in a measurement spot PMU2. In the same manner, the frequency fluctuation information having a fluctuation frequency close to 0.65 includes detection fluctuation information of No. 2 in the measurement spot PMU1. Thereafter, the measurement spot included in one piece of frequency fluctuation information is referred to as a measurement spot group candidate.

At this time, the fluctuation effect spot extraction unit 13 may categorize the detection fluctuation information in which a difference between fluctuation frequencies is within a frequency width into frequency fluctuation information of the same operation frequency by using a frequency width indicating a difference between predetermined fluctuation frequencies.

In the example of the aforementioned detection fluctuation information table, a fluctuation frequency of the detection fluctuation information of No. 1 of the measurement spot PMU2 is 0.19, and a fluctuation frequency of the detection fluctuation information of No. 1 of the measurement spot PMU1 is 0.18, but these are categorized into the same frequency fluctuation information. As the detection fluctuation information in which the fluctuation frequency is within the frequency width is categorized into the same frequency fluctuation information, it is possible to accurately estimate a distribution in the system of each fluctuation even in a case where an error due to noise is included in each piece of detection fluctuation information. Here, the frequency width which determines a range of the fluctuation frequency included in the same categorization may be determined based on the number of measurement information which is used as input data. As an example, the frequency width $\Delta f$ of the fluctuation frequency included in the same frequency fluctuation information is expressed in Expression 13. Here, N denotes the number of input data of the measurement information which is used for calculating the detection fluctuation information, $\Delta fs$ denotes a sampling frequency of the measurement information, and a denotes an integer which is designated in advance. In general, a frequency resolution for frequency analysis is high in a case where the sampling frequency of input data is low, and the frequency resolution is high in a case where the number of data is large, and thus, the frequency width $\Delta f$ of the fluctuation frequency included in the same frequency fluctuation information can be appropriately selected by Expression 13.

$$\Delta f = \alpha \cdot \Delta fa/N \qquad \text{[Expression 13]}$$

Subsequently, the fluctuation effect spot extraction unit 13 performs measurement spot-to-spot distance calculation processing of calculating a distance between measurement spots on the basis of the spot information DE stored in the information storage unit 30 (S72).

FIG. 7 illustrates measurement spot-to-spot distance calculation processing.

The fluctuation effect spot extraction unit 13 sequentially selects two measurement spots from measurement spots of the measurement information which is acquired by the measurement information collection unit 11 (S61).

Subsequently, the fluctuation effect spot extraction unit 13 calculates a distance between measurement spots between the selected two measurement spots on the basis of the spot information DB stored in the information storage unit 30 (S62). The spot information DB includes node information, power transmission wire information, and measurement spot information.

FIG. 8 illustrates the node information.

The node information includes a node name for identifying a node, positional information indicating a position of the node, and characteristics of a power generator, a power load, and a phase adjustment apparatus which are connected to the node, for each node of the power system. In an example of this figure, nodes A and B are linked to the power generator. The node A is linked to a thermal power generator which has a name that is called G1 and has rated capacity of 100, and the node B is linked to a wind power generator which has a name that is called G2 and has rated capacity of 200. In addition, in the example of this figure, nodes AA and BB are linked to the power load. The node AA is linked to a house which has a name that is called L1 and has rated capacity of 1000, and the node BB is linked to a factory which has a name that is called L2 and has rated capacity of 2000. In addition, in the example of this figure, nodes AAA and BBB are linked to the phase adjustment apparatus. The node AAA is linked to an SC (static condenser: condenser for power) which has a name that is called D1 and has rated capacity of 10, and the node BBB is linked to an ShR (shunt reactor: shunt reactor) which has a name that is called D2 and has rated capacity of 20.

FIG. 9 illustrates the power transmission wire information.

The power transmission wire information includes a power transmission wire name for identifying power transmission wire, both end nodes indicating nodes of both ends of the power transmission wire, normal phase resistance, normal phase reactance, and normal phase capacitance, for each power transmission wire of the power system. In the example of this figure, a power transmission wire a is positioned between the node A and the node B, normal phase resistance of the power transmission wire a is 0.01, normal phase reactance is 0.2, and normal phase capacitance is 0.1.

FIG. 10 illustrates the measurement spot information.

The measurement spot information includes identification information of two measurement spots and a distance between measurement spots, for each measurement spot in the power system. The measurement spot indicates a spot to which the measuring devices 21a, 21b, are connected. In an example of this figure, the identification information of the measurement spot includes a measurement spot name indicating the measuring device 21, and a node name which is included in the node information. A measurement spot of the measurement spot name which is called PMU1 is connected to the node A, and a measurement spot of the measurement spot name which is called PMU2 is connected to the node B. In addition, a distance between the measurement spots is a value which is calculated based on an electrical distance between two measurement spots and a system element such as a power generator, a power load, or a phase adjustment apparatus which is linked to the vicinity of the two measurement spots. For example, a distance D between the measurement spots is calculated by following (Expression 14).

$$D = \alpha d + \sum_{i=1}^{n} \beta_i C_i$$ [Expression 14]

Here, D indicates an electrical distance proportional to impedance between two measurement spots. n indicates the number of system elements such as a power generator, a power load, and a phase adjustment apparatus which are linked from any one of two measurement spots within a range of an electrical distance that is determined by a certain threshold value. $C_i$ indicates rated capacity of the $i^{th}$ system element which is linked from any one of two measurement spots within a range of an electrical distance that is determined by a certain threshold value. $\alpha$ and $\beta_i$ indicate coefficients. By using an electrical distance between two measurement spots, it can be determined whether or not fluctuation components of the two measurement spots are the same.

A data configuration illustrated in the figure of the spot information DB is an example, and the information storage unit 30 may store further detailed spot information. For example, the node information may include dynamic characteristics of a power generator such as a governor constant as information of node which is linked to a thermal power generator. In addition, the node information may include stochastic power generation amount variation characteristics which are calculated by using statistical analysis which uses a past history as information of a node which is linked to a power generator that uses natural energy, such as a wind power generator. In addition, the fluctuation effect spot extraction unit 13 may determine the coefficient $\beta_i$ (Expression 1) on the basis of the dynamic characteristics of a power generator so as to calculate a distance between measurement spots in the measurement spot information. In addition, the fluctuation effect spot extraction unit 13 may calculate a distance between measurement spots to set the calculated value as the distance D between measurement spots by using latitude and longitude information included in the node information without using information of a system element such as impedance, a power generator, a power load, or a phase adjustment apparatus.

Subsequently, the fluctuation effect spot extraction unit 13 determines whether to calculate distances between measurement spots or not with respect to the entire two spots which are combined, in the measurement spots of the measurement information acquired by the measurement information collection unit 11 (S63). In a case where it is determined that distances between measurement spots are calculated with respect to the entire two spots which are combined (Yes), the fluctuation effect spot extraction unit 13 ends the measurement spot-to-spot distance calculation processing. In a case where there is a combination of measurement spots in which a distance between measurement spots is not calculated (No), the fluctuation effect spot extraction unit 13 repeats S61 and S62 at other two measurement spots. By the aforementioned processing, a distance between measurement spots is calculated with respect to the entire two measurement spots which are combined.

After S72 of fluctuation effect spot extraction processing, the fluctuation effect spot extraction unit 13 categorizes the frequency fluctuation information obtained in S71 into distances between measurement spots, and stores the results in the information storage unit 30 as region fluctuation information (S73). At this time, the fluctuation effect spot extraction unit 13 may categorize the frequency fluctuation information by using a clustering method which is typical of a ward method and a k-means method, using a distance between measurement spots, for each frequency fluctuation information (fluctuation frequency).

FIG. 11 illustrates a region fluctuation information table.

The region fluctuation information table includes entry for each region fluctuation information which is categorized by a distance between measurement spots. Entry corresponding to one piece of region fluctuation information includes a fluctuation number (No.) indicating fluctuation components which are denoted by the region fluctuation information, a fluctuation frequency of frequency fluctuation information corresponding to the region fluctuation information, a measurement spot name indicating a measurement spot of frequency fluctuation information corresponding to the region fluctuation information, and fluctuation characteristics indicating characteristics of the fluctuation components. The fluctuation characteristics include the attenuation coefficient, the amplitude, and the initial phase, in the same manner as the fluctuation characteristics of the frequency fluctuation information. In an example of this figure, detection fluctuation information with a fluctuation frequency of 0.18 which is observed at the measurement spot PMU1 and detection fluctuation information with the same fluctuation frequency of 0.18 which is observed at the measurement spot PMU3 are categorized into region fluctuation information different from each other. This is because distances between measurement spots at the measurement spot PMU1 and the measurement spot PMU3 are relatively longer than other distances between measurement spots. As such, the frequency fluctuation information is categorized by using the spot information DB.

In a case where a difference between fluctuation frequencies of fluctuation components detected at a plurality of measurement spots is within a predetermined range, a plurality of measurement spots are categorized by electrical distances between the plurality of measurement spots on the basis of the spot information DB, and measurement spots belonging to each categorization are extracted as a measurement spot group, and thereby, it is possible to specify a region where each of fluctuation components exists.

After S32 of the system stability determination processing, the fluctuation effect degree calculation unit 14 performs fluctuation effect degree calculation processing of calculating a degree of effect on fluctuation by using the region fluctuation information (S33).

FIG. 12 illustrates the fluctuation effect degree calculation processing.

First, the fluctuation effect degree calculation unit 14 extracts a measurement spot which is included in the region fluctuation information for each piece of region fluctuation information (S81). In an example of the aforementioned region fluctuation information table, the fluctuation effect degree calculation unit 14 extracts the measurement spots "PMU1", "PMU3", in which fluctuation components of a fluctuation frequency of "0.18" are detected in a fluctuation number "1". In the same manner, the fluctuation effect degree calculation unit 14 extracts the measurement spot "PMU1", in which fluctuation components of a fluctuation frequency of "0.65" are detected in a fluctuation number "2".

Subsequently, the fluctuation effect degree calculation unit 14 calculates a degree of effect on fluctuation for each piece of the region fluctuation information from the fluctuation characteristics corresponding to the measurement spot extracted in S81 (S82).

By calculating the degree of effect on fluctuation, the extent of effect of each of fluctuation components on stability of the power system can be denoted.

FIG. 13 illustrates a concept of the fluctuation effect degree calculation processing.

Here, $J_{ijk}$ is referred to as a degree of effect on fluctuation of region fluctuation information j and a measurement type k at a measurement spot i, $X_{ijk}$ is referred to as measurement information of the measurement type k in the region fluctuation information j at the measurement spot i, t1 and t2 (t1<t2) are referred to as time which is designated in advance, $B_{ijk}$ is referred to as an amplitude of fluctuation calculated by Expression 12, and $\sigma_{ijk}$ is referred to as an attenuation coefficient calculated by Expression 7. The fluctuation effect degree calculation unit 14 calculates the degree of effect on fluctuation $J_{ijk}$ for each piece of region fluctuation information by using Expression 15.

$$J_{ijk} = \int_{t1}^{t2} |B_{ijk} \exp(\sigma_{ijk} t)| dt$$
$$= \frac{|B_{ijk}|\{\exp(\sigma_{ijk} t_2) - \exp(\sigma_{ijk} t_1)\}}{\sigma_{ijk}}$$

[Expression 15]

Here, if time which is a reference of analysis is defined as 0 and the time is set to 0>t2>t1, a degree of effect on fluctuation of region fluctuation information earlier than analysis reference time is calculated. In the same manner, if time is set to t2>0>t1, the degree of effect on fluctuation of current region fluctuation information including the analysis reference time is calculated, and if time is set to t2>t1>0, the degree of effect on fluctuation of region fluctuation information later than the analysis reference time is calculated. For example, by setting time to t2>t1>0, or by predicting a time change of future fluctuation components at a measurement spot and calculating a degree of effect on fluctuation on the basis of the predicted fluctuation components, whether or not the measurement spot is destabilized in future can be determined by the degree of effect on fluctuation. By using an amplitude and an attenuation coefficient for the degree of effect on fluctuation, a future degree of effect on fluctuation can be predicted.

As the degree of effect on fluctuation $J_{ijk}$ is calculated by definition of Expression 15, the amplitude $B_{ijk}$ increases, the attenuation coefficient $\sigma_{ijk}$ deteriorates (the attenuation coefficient $\sigma_{ijk}$ increases), and the degree of effect on fluctuation of the region fluctuation information increases. Here, instead of the degree of effect on fluctuation which is defined by Expression 15, a value of the amplitude $B_{ijk}$ itself or a value of the attenuation coefficient $\sigma_{ijk}$ itself may be defined as the degree of effect on fluctuation.

In addition, the fluctuation effect degree calculation unit 14 may select past region fluctuation information corresponding to a situation of a measurement spot group of current region fluctuation information from the past region fluctuation information and may calculate the degree of effect on fluctuation by considering continuous time of fluctuation components of the selected past region fluctuation information, with reference to the past region fluctuation information. For example, the fluctuation effect degree calculation unit 14 may set such that the degree of effect on fluctuation $J_{ijk}$ increases, in a case where a period in which fluctuation components with the same fluctuation frequency continuously exist is longer than or equal to a predetermined threshold period, and may set such that the degree of effect on fluctuation $J_{ijk}$ decreases, in a case where the period in which the fluctuation components with the same fluctuation frequency continuously exist is shorter than or equal to the predetermined threshold period, in the past region fluctuation information. As the degree of effect on fluctuation $J_{ijk}$ is determined in such a way, fluctuation due to effect of noise which is instantaneously included in system fluctuation can be excluded, and thereby, fluctuation components which exist normally can be preferentially monitored.

FIG. 14 illustrates a past fluctuation information table.

The past fluctuation information table includes entry for each instance. Entry of one instance includes instance details indicating the instance, and at least one region fluctuation information corresponding to the instance. The instance details include time, a date or a day, a month or a season, an event type, and the like. The region fluctuation information includes a fluctuation number, a fluctuation frequency, a degree of effect on fluctuation, a measurement spot, an attenuation coefficient, an amplitude, and an initial phase.

The fluctuation effect degree calculation unit 14 categorizes the past region fluctuation information in each instance, and stores information which is statistically processed in the information storage unit 30 as past fluctuation information. The fluctuation effect degree calculation unit 14 sets the instances on the basis of information on time, a date, a day, a month, a season, an event type of measurement information which is used for calculating detection fluctuation information.

The fluctuation effect degree calculation unit 14 sets instances by using time, thereby, being able to reflect a variation effect of a flow situation in a system for one day into statistics processing of region fluctuation information. Variation of the flow situation in this case is caused by a life behavior for one day in which a working day that is divided by commuting time in the morning and the evening is used as an example. In the example of this figure, 8:00 to 10:00 is set in an instance No. 1, and 12:00 to 14:00 is set in an instance No. 2.

The fluctuation effect degree calculation unit 14 sets instances by using a date or a day, thereby, being able to reflect a variation effect of a flow situation in a system for one week into statistics processing of region fluctuation information. Variation of the flow situation in this case is caused by a life behavior in each day in which a weekday and a holiday are used as an instance. In the example of this figure, Saturday is set in the instance No. 1, and Monday to Friday are set in the instance No. 2.

The fluctuation effect degree calculation unit 14 sets instances by using a month or a season, thereby, being able to reflect a variation effect of a flow situation in a system for one year into statistics processing of region fluctuation information. Variation of a flow situation in this case is caused by a life behavior in each month or each season in which demand of air conditioning in summer and demand of heating in winter are used as an example. In the example of this figure, March to May are set in the instance No. 1, and July to September are set in the instance No. 2.

The fluctuation effect degree calculation unit 14 sets an instance by using an event type, thereby, being able to reflect a variation effect of a flow situation in a system according to an event such as system failure and system switching into statistics processing of region fluctuation information. In the example of this figure, no event is set in the instance No. 1, and 1 LG of the node AA is set in the instance No. 2.

The fluctuation effect degree calculation unit 14 may set an instance in which a node that is set as a monitoring target in advance or the amount of flow of a power transmission wire, the amount of power generation of a power generator, and weather information including separation of good weather, cloudy weather, and rain, or temperature information are used as a categorization item, in addition to a setting method of the aforementioned instance, and may perform statistics processing of region fluctuation information.

Here, past fluctuation information calculation processing in which the fluctuation effect degree calculation unit 14 calculates past fluctuation information will be described.

FIG. 15 illustrates the past fluctuation information calculation processing.

First, the fluctuation effect degree calculation unit 14 stores measurement information of a plurality of points of time (S141).

Subsequently, the fluctuation effect degree calculation unit 14 calculates region fluctuation information and a degree of effect on fluctuation thereof at the plurality of point of time by using the stored measurement information (S142). At this time, fluctuation effect degree calculation unit 14 calculates region fluctuation information and the degree of effect on fluctuation, according to the aforementioned processing of S31 to S33.

Subsequently, the fluctuation effect degree calculation unit 14 sets categorization of instances (S143). At this time, the fluctuation effect degree calculation unit 14 uses at least one piece of information on time, a date, a day, a month, a season, and an event type which are indicated in the past fluctuation information, as a categorization item. The fluctuation effect degree calculation unit 14 determines start and end of a period, a categorization name of an event type, or a minimum value and a maximum value of numerical information with respect to each of the categorization items which are used, and sets categorization.

Subsequently, the fluctuation effect degree calculation unit 14 calculates region fluctuation information for each instance and a degree of effect on fluctuation on the basis of categorization of instances which are set in S143 (S144). At this time, the fluctuation effect degree calculation unit 14 categorizes analysis times in which the region fluctuation information and the degree of effect on fluctuation are calculated in S142, in each instance, and sets a representative value which is calculated by performing statistics processing of information on the region fluctuation information and the degree of effect on fluctuation at a plurality of time categorized into the same instance, as region fluctuation information and a degree of effect on fluctuation of each instance. The fluctuation effect degree calculation unit 14 uses an average value and a medium value of each of the region fluctuation information and the degree of effect on fluctuation as the representative value.

The past fluctuation information calculation processing is described as above. In the fluctuation effect degree calculation processing, the fluctuation effect degree calculation unit 14 may extract an instance closest to a situation of analysis time with reference to past fluctuation information calculated in the past fluctuation information calculation processing, and may apply a degree of effect on fluctuation of the extracted instance. The fluctuation effect degree calculation unit 14 excludes fluctuation due to effects of instantaneous noise included in system fluctuation at the analysis time by using the statistics processing results of the past region fluctuation information, and thereby, it is possible to accurately select fluctuation components which are preferentially monitored.

After S82, the fluctuation effect degree calculation unit 14 calculates a degree of effect on fluctuation of region fluctuation information j at a measurement spot i, according to Expression 16 (S83). Here, $\beta_k$ is a coefficient which is set with respect to a measurement information type k. $\beta_k$ may be a reciprocal number of a rated value of each measurement type k. The fluctuation effect degree calculation unit 14 can calculate a degree of effect on fluctuation of measurement information of a plurality of types by normalizing in a ratio with respect to rating, using a rated value of each measurement type. In addition, a value of the coefficient $\beta_k$ corresponding to the measurement type k may be set to be large compared with a coefficient with respect to other types so as to extract the degree of effect on fluctuation of a specified measurement type.

$$J_{ij} = \Sigma J_{ijk} \cdot \beta_k \qquad \text{[Expression 16]}$$

Furthermore, the fluctuation effect degree calculation unit 14 may calculate a degree of effect on fluctuation $J_i$ in which the entire region fluctuation information at the measurement spot i is considered by using following Expression 17. Here, $\gamma_j$ is a coefficient which is set with respect to the region fluctuation information j. By increasing the coefficient $\gamma_j$ with respect to a certain region fluctuation information j, a degree of effect on fluctuation in which specified region fluctuation information is highly regarded can be calculated.

$$J_i = \Sigma J_{ij} \gamma_j \qquad \text{[Expression 17]}$$

By the aforementioned fluctuation effect degree calculation processing, a degree of effect on fluctuation $J_{ij}$ of the region fluctuation information j at the measurement spot i or a degree of effect on fluctuation $J_i$ at the measurement spot i is calculated by the aforementioned fluctuation effect degree calculation processing.

After S33 of the system stability determination processing, the unstable spot detection unit 15 detects an unstable spot by using the degree of effect on fluctuation (S34). In a case where a degree of effect on fluctuation of a certain measurement spot is greater than a predetermined fluctuation effect degree threshold value $J_{thr}$, the unstable spot detection unit 15 determines that the measurement spot is an unstable spot. By doing so, stability determination is performed for each of fluctuation components which are categorized by a positional relationship, and thus, it is possible to increase accuracy of stability determination.

In addition, the unstable spot detection unit 15 performs modelling of a propagation situation of fluctuation components, and thus, it is possible to perform unstable spot detection processing of detecting unstable spots including an unstable spot which will be generated in future.

FIG. 16 illustrates the unstable spot detection processing.

First, the unstable spot detection unit 15 selects a target spot (specified spot) whose stability is determined (S101). At this time, the target spot is a spot within a power system, and the unstable spot detection unit 15 may select a spot other than the measurement spot as the target spot from the spot information DB.

Subsequently, the unstable spot detection unit 15 performs fluctuation propagation calculation processing of calculating a fluctuation propagation speed which is a propagation speed of corresponding fluctuation components and a fluctuation propagation direction which is a propagation direction of the fluctuation components, from the degree of effect on fluctuation $J_{ij}$ or $J_i$ of a measurement spot in the periphery of the target spot selected in S101 (S102, S103).

FIG. 17 illustrates a conceptual diagram of the fluctuation propagation calculation processing.

This figure illustrates a positional relationship 300, a time change 301 of a degree of effect on fluctuation of PMU1, a time change 302 of a degree of effect on fluctuation of PMU2, and a time change 304 of a degree of effect on fluctuation of PMU4. When the unstable spot detection unit 15 uses Point1 as the target spot, five measurement spots of PMU1 to PMU5 are disposed in the periphery of the target spot. Here, a case where the degree of effect on fluctuation of each measurement spot is greater than $J_{thr}$ is defined as an unstable state. As illustrated in this figure, unstable time when time is destabilized is set as t1 at the measurement spot PMU1. In the same manner, unstable time is set as t2 at the measurement spot PMU2, and unstable time is set as t4 at the measurement spot PMU4.

The unstable spot detection unit 15 categorizes measurement spots by a connection direction of power transmission wires at the target spot, with reference to the target spot Point1, by using a system configuration information included in the spot information DB, (S102). In an example of this figure, the five measurement spots are categorized into a measurement spot group of PMU1, PMU2, and PMU4 which are connected through southern power transmission wires, and a measurement spot group of PMU3 and PMU5 which are connected through northern power transmission wires, with respect to the target spot Point1. At this time, the unstable spot detection unit 15 may calculate a disposition direction of each measurement spot which uses the target spot Point1 as a reference by using a latitude and a longitude of each spot included in the spot information DB, and may categorize the measurement spots into a plurality of measurement spot groups by the disposition direction.

Subsequently, the unstable spot detection unit 15 calculates the fluctuation propagation speed for each measurement spot group categorized in S102 (S103). In this processing, the unstable spot detection unit 15 calculates the fluctuation propagation speed by using an electrical distance between the measurement spots and the unstable time. The unstable spot detection unit 15 calculates a fluctuation propagation speed $V_{mn}$ between measurement spots m and n by using Expression 18. Here, $d_{mn}$ is set as an electrical distance between the measurement spots m and n, and $t_m$ and $t_n$ are respectively set as unstable time at measurement spots m and n.

$$V_{mn} = d_{mn}/|t_m - t_n| \qquad \text{[Expression 18]}$$

Here, the unstable spot detection unit 15 may calculate the fluctuation propagation speed between measurement spots on the basis of Expression 18, with respect to a spot between the measurement spots in the measurement spot group, and may set an average value thereof as a propagation speed. In an example illustrated in the conceptual diagram of the aforementioned fluctuation propagation calculation processing, the unstable spot detection unit 15 calculates a fluctuation propagation speed between PMU1 and PMU2 and a fluctuation propagation speed between PMU2 and PMU4, and sets an average value thereof as the fluctuation propagation speed.

Subsequently, the unstable spot detection unit 15 obtains unstable time $t_p$ of the target spot by using the fluctuation propagation speed obtained in S103 (S104). $t_p$ is obtained by following Expression 19. Here, V is set as a fluctuation propagation speed, d is set as an electrical distance between the measurement spot m and the target spot, and $t_m$ is set as unstable time of the measurement spot m.

$$t_p = t_m + d/V \qquad \text{[Expression 19]}$$

Here, the unstable spot detection unit 15 may calculate each of a plurality of tps on the basis of Expression 19, with respect to a plurality of measurement spots in a measurement spot group, and may set an average value thereof as unstable time of the target spot.

By calculating a propagation situation of the degree of effect on fluctuation, time which will be destabilized at the target spot in future can be calculated. Thereby, time which will be destabilized before being actually destabilized can also be estimated even at other spots other than the measurement spot, and thus, control can be performed based on rapid and accurate determination. In addition, by using a fluctuation propagation speed and a fluctuation propagation direction, an arbitrary spot in a power system can be set as the target spot.

FIG. 18 illustrates a display screen.

The unstable spot detection unit 15 selects region fluctuation information with high degree of effect on fluctuation in specified time. The unstable spot detection unit 15 displays a display screen on which the selected region fluctuation information is displayed on the display device 202. The display screen separately displays the measurement spots included in the selected region fluctuation information, and, for example, displays each region fluctuation information on a system diagram by dividing colors thereof. For example, the display screen displays a system diagram on a left column 410 of the screen, and displays the measurement spots PMU1 to PMU5 on the system diagram. The display screen further displays the measurement spots included in each region fluctuation information at a region surrounded by a dashed line or an alternate long and short dash line, based on the region fluctuation information. In an example of this figure, PMU1, PMU2, and PMU4 are included in one piece of the region fluctuation information, and PMU1, PMU3, and PMU5 are included in another piece of the region fluctuation information.

In addition, the display screen displays details of the region fluctuation information, information on ground and short circuit faults which occur at a neighboring area effecting wide fluctuation phenomenon, information on coming-off of power generator, and the like in a column 420 on an upper right side. The details of the region fluctuation information preferentially display the region fluctuation information with high degree of effect on fluctuation. Furthermore, the display screen displays time-series data of the measurement spot selected by an operator (manager) and measurement information for each kind, on a graph in a column 430 on a lower right side. The operator can select the latest information or past information as a display time zone of the time-series data. A fluctuation frequency included in each region fluctuation information, and time-series data of an attenuation coefficient may be displayed in addition to the information illustrated in an example of the display screen. In a case where a current or future unstable spot is recognized by the display screen, a manager can perform an action such as separation of a power station relating to the unstable spot. The display screen may display a time change of a degree of effect on fluctuation of the selected measurement spot or a measurement spot group.

According to the aforementioned embodiments, even in a case where a plurality of fluctuation components with fluctuation frequencies close to each other exist simultaneously, a plurality of measurement spots relating to each other can be extracted based on an electrical distance between the measurement spots, and thus, fluctuation components different from each other are categorized, stability determination can be performed for each of the fluctuation components. Accordingly, it is possible to realize rapid and accurate stability determination.

Words for expressing the invention will be described. The system stability monitoring device 200 or the like may be used as a system stability monitoring device. The measuring device 20 may be used as a measuring device. The storage device 206 or the like may be used as a storage unit. The communication means 203 or the like may be used as a receiving unit. The system stability calculation unit 10 or the like may be used as a calculation unit. The spot information DB may be used as spot information. The information communication network 108 or the like may be used as a communication wire. The detection fluctuation information or the like may be used as fluctuation information. The system stability monitoring device 200 or the like may be used as a monitoring device.

REFERENCE SIGNS LIST

10 SYSTEM STABILITY CALCULATION UNIT 11 MEASUREMENT INFORMATION COLLECTION UNIT 12 FLUCTUATION DETECTION UNIT 13 FLUCTUATION EFFECT SPOT EXTRACTION UNIT 14 FLUCTUATION EFFECT DEGREE CALCULATION UNIT 15 UNSTABLE SPOT DETECTION UNIT 20 SYSTEM MEASURING UNIT 21 MEASURING DEVICE 30 INFORMATION STORAGE UNIT 101 POWER GENERATOR 102 TRANSFORMING STATION 103 PHASE ADJUSTMENT APPARATUS 104 POWER LOAD 105 EXTERNAL POWER SYSTEM 108 INFORMATION COMMUNICATION NETWORK 200 SYSTEM STABILITY MONITORING DEVICE

The invention claimed is:

1. A system stability monitoring device that monitors stability of a power system, comprising:
   a memory that stores spot information indicating a positional relationship between a plurality of measurement spots in the power system; and
   a processor communicatively coupled to the memory;
   wherein the processor is configured to:
   receive time-series measurement information from a plurality of sensors that are provided at each of the plurality of measurement spots; and
   detect frequency components of power fluctuation from the measurement information,
   select measurement spot group candidates which are measurement spots among the plurality of measurement spots based on the frequency components detected,
   determines electrical distances between the measurement spot group candidates based on the spot information, and
   categorize the measurement spot group candidates into at least one measurement spot group based on the electrical distances determined.

2. The system stability monitoring device according to claim 1, wherein the processor is further configured to:
   calculate fluctuation information of the frequency components, wherein the fluctuation information includes at least one of a fluctuation frequency, an attenuation coefficient, and an amplitude of the frequency components.

3. The system stability monitoring device according to claim 2, wherein the processor is further configured to:
   calculate a degree of effect on fluctuation based on the fluctuation information, wherein degree of effect of fluctuation indicates an extent of effect of the frequency components on stability of the power system.

4. The system stability monitoring device according to claim 3, wherein the the processor is further configured to:
   determine whether or not the measurement spot group is unstable, based on the degree of effect on fluctuation calculated.

5. The system stability monitoring device according to claim 4, wherein the spot information indicates at least one of a latitude and a longitude of each of the plurality of measurement spots, a topology between the plurality of measurement spots, impedance between the plurality of measurement spots, and characteristics of a power apparatus which is linked to vicinity of each of the plurality of measurement spots.

6. The system stability monitoring device according to claim 5, wherein the processor is further configured to:
   set measurement spots in which differences between the fluctuation frequencies detected are within a predetermined range, among the plurality of measurement spots, as the measurement spot group candidates.

7. The system stability monitoring device according to claim 3, wherein the the processor is further configured to:
predict a time change of the degree of effect on fluctuation, and
determine whether or not a specified spot in the power system will be destabilized in future based on the time change of the degree of effect on fluctuation.

8. The system stability monitoring device according to claim 7, wherein the processor is further configured to:
calculate a propagation situation of the degree of effect on fluctuation based on the time change of the degree of effect on fluctuation, and
calculate a destabilization time when the specified spot is destabilized based on the propagation situation.

9. The system stability monitoring device according to claim 3,
wherein the memory further stores past fluctuation information, and
wherein the processor is further configured to:
select the past fluctuation information corresponding to a situation of the measurement spot group, and
calculate the degree of effect on fluctuation based on frequency components in the selected past fluctuation information.

10. The system stability monitoring device according to claim 1, wherein the electrical distances between two measurement spots of the plurality of measurement spots are proportional to impedance between two respective measurement spots.

11. The system stability monitoring device according to claim 1, wherein the processor is configured to control a display to display at least one of a system diagram of the power system and a map, and a screen indicating the measurement spot group, based on the spot information.

12. A system stability monitoring system that monitors stability of a power system, comprising:
a plurality of sensors that are respectively provided at a plurality of measurement spots in the power system; and
a memory that stores spot information indicating a positional relationship between the plurality of measurement spots;
a processor that is communicatively coupled to the plurality of sensors and the memory,
wherein the processor is configured to:
receive time-series measurement information which is measured by each of the plurality of measuring devices, and
detect frequency components of power fluctuation from the measurement information,
select measurement spot group candidates which are measurement spots among the plurality of measurement spots based on the frequency components detected,
determines electrical distances between the measurement spot group candidates based on the spot information, and
categorize the measurement spot group candidates into at least one measurement spot group based on the electrical distances determined.

* * * * *